United States Patent
Oogaki et al.

(10) Patent No.: US 9,815,991 B2
(45) Date of Patent: Nov. 14, 2017

(54) INK COMPOSITION FOR INKJET RECORDING, METHOD FOR PRODUCING PRINTED MATERIAL, AND PRINTING METHOD

(71) Applicant: DNP FINE CHEMICALS CO., LTD., Yokohama-shi, Kanagawa (JP)

(72) Inventors: Megumi Oogaki, Yokohama (JP); Shinichi Yoshimitsu, Yokohama (JP); Katsumi Watanabe, Yokohama (JP); Ryohei Oka, Yokohama (JP); Yukiko Ishima, Yokohama (JP); Karuna Iwasawa, Yokohama (JP)

(73) Assignee: DNP FINE CHEMICALS CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 15/121,877

(22) PCT Filed: Feb. 25, 2015

(86) PCT No.: PCT/JP2015/055386
§ 371 (c)(1),
(2) Date: Sep. 14, 2016

(87) PCT Pub. No.: WO2015/129744
PCT Pub. Date: Sep. 3, 2015

(65) Prior Publication Data
US 2017/0015849 A1    Jan. 19, 2017

(30) Foreign Application Priority Data

Feb. 28, 2014   (JP) .................... 2014-038557

(51) Int. Cl.
C09D 11/033   (2014.01)
C09D 11/107   (2014.01)
B41J 2/01     (2006.01)
C09D 11/30    (2014.01)
C09D 11/17    (2014.01)
C09D 11/50    (2014.01)

(52) U.S. Cl.
CPC ............... C09D 11/033 (2013.01); B41J 2/01 (2013.01); C09D 11/107 (2013.01); C09D 11/17 (2013.01); C09D 11/30 (2013.01); C09D 11/50 (2013.01)

(58) Field of Classification Search
CPC ....... C09D 11/36; C09D 11/322; C09D 11/30; B41J 2/01
See application file for complete search history.

(56) References Cited

U.S. PATENT DOCUMENTS

| | | | |
|---|---|---|---|
| 7,625,440 B2 * | 12/2009 | Wynants | C09D 11/101 106/31.78 |
| 2004/0094067 A1 | 5/2004 | Oyanagi et al. | |
| 2004/0266907 A1 | 12/2004 | Sugita et al. | |
| 2006/0189113 A1 * | 8/2006 | Vanheusden | B22F 1/0018 438/597 |
| 2008/0097013 A1 | 4/2008 | Mizutani | |
| 2009/0239980 A1 | 9/2009 | Sugita et al. | |
| 2010/0174013 A1 * | 7/2010 | Sugita | C09D 11/36 524/93 |

(Continued)

FOREIGN PATENT DOCUMENTS

| JP | 2005-200469 A | 7/2005 |
|---|---|---|
| JP | 2007-204718 A | 8/2007 |
| JP | 2008-260944 A | 10/2008 |

(Continued)

OTHER PUBLICATIONS

International Search Report dated May 26, 2015; PCT/JP2015/055386.

*Primary Examiner* — Stephen Meier
*Assistant Examiner* — John P Zimmerman
(74) *Attorney, Agent, or Firm* — Ladas & Parry LLP

(57) ABSTRACT

An ink composition for inkjet recording, including: a color material, a binder resin, and an organic solvent, wherein the binder resin contains at least an acrylic-based resin (A), and a copolymer (B) having a constitutional unit derived from a hydroxyalkyl (meth)acrylate, a constitutional unit represented by the formula (I), and a constitutional unit represented by the formula (II), a content ratio by mass of the resin (A) to copolymer (B) is 25/75 to 70/30, and wherein the solvent contains at least a polyalkylene glycol dialkyl ether and a cyclic ester, a content ratio of the cyclic ester is 3 parts by mass or more and 10 parts by mass or less relative to 100 parts by mass of the ink composition, and a content ratio of the ethylene glycol alkyl ether acetate is 5 parts by mass or less relative to 100 parts by mass of the ink composition:

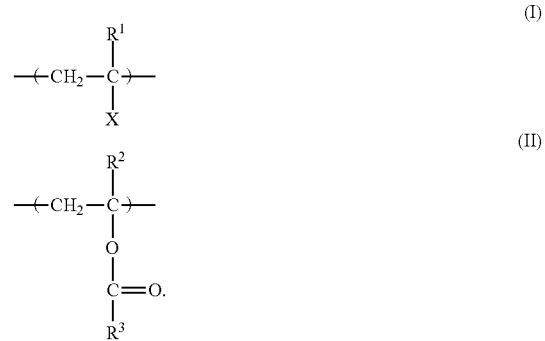

6 Claims, No Drawings

(56) References Cited

U.S. PATENT DOCUMENTS

2012/0249666 A1* 10/2012 Maki .................... C09D 11/322
　　　　　　　　　　　　　　　　　　　　　　347/20
2016/0194508 A1* 7/2016 Yodo .................... C09D 11/106
　　　　　　　　　　　　　　　　　　　　　　428/207

FOREIGN PATENT DOCUMENTS

| JP | 4308526 B2 | 8/2009 |
| JP | 2009-227813 A | 10/2009 |
| JP | 4683533 B2 | 5/2011 |
| JP | 2013-177597 A | 9/2013 |

\* cited by examiner

INK COMPOSITION FOR INKJET RECORDING, METHOD FOR PRODUCING PRINTED MATERIAL, AND PRINTING METHOD

TECHNICAL FIELD

The present invention relates to an ink composition for inkjet recording, a method for producing a printed material, and a printing method.

BACKGROUND ART

Recently, provision of printed materials of various kinds and small lots is under progress, and attention is drawn to, as a substitute for off-set printing of a related art, an inkjet printing which is an on-demand printing made easy to respond to various kinds and small lots. Furthermore, compared to off-set printing of a related art, the inkjet printing is more convenient and has an advantage in terms of economic efficiency and energy saving.

The inkjet printing is a printing method in which fine ink droplets ejected from a printer head are landed on a recording medium, infiltrated and fixed to form dots, and in accordance with gathering of many of those dots, an image is formed. Ink for inkjet printing is required to have, in addition to physical properties related to image quality of a printed material or weather resistance, various properties including inkjet suitability such as ejection stability or intermittent ejection stability from a printer head.

Patent Literature 1 discloses an oil-based ink for a piezo-type inkjet printer containing a fixing resin, a pigment, and a specific solvent, as an ink that has no ink clogging in a printer nozzle during printing, an excellent ink ejection property and ejection recoverability, and an excellent fixing property to a material to be recorded and drying property. In Patent Literature 1, as the specific solvent, a combination of a specific cyclic ester and ethylene glycol monobutyl ether acetate is disclosed. Furthermore, as the fixing resin, a combination of an acrylic resin and a vinyl chloride-vinyl acetate copolymer resin is disclosed.

Patent Literature 2 discloses an oil-based ink composition containing a mixed solvent having specific polyoxyethylene glycol dialkyl ether and a lactone-based solvent at a specific ratio and a color material, as an oil-based ink composition for inkjet recording that is suitable for printing on a polyvinyl chloride substrate and is excellent in terms of any of print quality, printing stability, print drying property, and preservation stability of ink. Patent Literature 2 discloses that, as a binder resin for the oil-based ink composition, a combination of a (meth)acrylic resin and a vinyl chloride-vinyl acetate copolymer resin and/or a fibrous resin is used.

Patent Literature 3 discloses an ink composition for inkjet recording containing a mixture of specific diethylene glycol and specific dipropylene glycol as a solvent, as an oil-based ink composition for inkjet recording that can provide a high quality image with high gloss, excellent water resistance and friction resistance, and no feathering or bleeding. However, the aforementioned solvent used in the ink composition of Patent Literature 3 is easy to have clogging in a printer nozzle. Furthermore, because the solvent has poor solubility for the vinyl chloride-vinyl acetate copolymer, a content ratio of the copolymer cannot be increased. Thus, there are cases in which a printed material has insufficient optical density.

It is also required to have an additional improvement of resistance such as alcohol resistance and stretchability of a printed material to be obtained. When applied to a wall surface, for example, a printed material with excellent stretchability is not likely to generate cracks under stretching of wrinkles, and thus a change in color tone is suppressed.

CITATION LIST

Patent Literature

Patent Literature 1: JP 2005-200469 A
Patent Literature 2: JP 4683533 B2
Patent Literature 3: JP 4308526 B2

SUMMARY OF INVENTION

Technical Problem

In the field of inkjet printing, from the viewpoint of further improving productivity, it is required to increase printing speed without decreasing in quality of a printed material or reliability of physical properties of a coating film such as alcohol resistance of a printed material. To increase the printing speed, the ejection number of the ink per unit time needs to be increased, and thus it is required to have more excellent ejection stability compared to an ink of a related art. Furthermore, in view of a demand for winding a printed material after inkjet printing to save spaces, for example, it is also required to have an enhanced drying property of an ink after printing than before. Meanwhile, in terms of ejection stability, it is also necessary to suppress drying of an ink at nozzle part. Furthermore, as the printing speed is increased and the drying property of an ink is enhanced, the amount of a solvent which volatilizes per unit time increases, and thus a problem of odor occurs from an ink composition, which has not been present as a problem at the printing rate of a related art.

The present invention is achieved under the circumstances described above, and an object of the invention is to provide an ink composition for inkjet recording which allows high-speed printing with low odor while maintaining the quality of a printed material, a method for producing a printed material and a printing method by using the ink composition for inkjet recording.

Solution to Problem

An ink composition for inkjet recording according to the present invention includes: a color material, a binder resin, and an organic solvent, wherein the binder resin contains at least an acrylic-based resin (A), and a copolymer (B) having a constitutional unit derived from a hydroxyalkyl (meth)acrylate, a constitutional unit represented by the following general formula (I), and a constitutional unit represented by the following general formula (II), a content ratio by mass of the acrylic-based resin (A) to the copolymer (B) ((A)/(B)) is 25/75 or more and 70/30 or less, and wherein the organic solvent contains at least a polyalkylene glycol dialkyl ether and a cyclic ester, a content ratio of the cyclic ester is 3 parts by mass or more and 10 parts by mass or less relative to 100 parts by mass of the ink composition, and a content ratio of the ethylene glycol alkyl ether acetate is 5 parts by mass or less relative to 100 parts by mass of the ink composition:

-continued

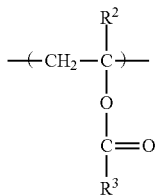
(II)

wherein each of $R^1$ and $R^2$ is independently a hydrogen atom, or a methyl group; $R^3$ is an alkyl group having 1 to 3 carbon atoms; and X is a halogen atom.

In the ink composition for inkjet recording of the present invention, from the viewpoint of having an excellent intermittent ejection property and improved quality of a printed material, it is preferable that the organic solvent further contains a polyalkylene glycol alkyl ether represented by the following general formula (III) and the content ratio of the polyalkylene glycol alkyl ether is 3 parts by mass or more and 15 parts by mass or less relative to 100 parts by mass of the ink composition:

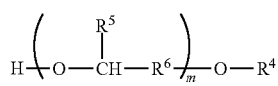
(III)

wherein $R^4$ is an alkyl group having 1 to 4 carbon atoms; $R^5$ is a hydrogen atom, or a methyl group; $R^6$ is a methylene group or an ethylene group; and m is an integer of 2 or more and 4 or less; a plurality of $R^5$s can be the same or different; and a plurality of $R^6$s can be the same or different.

A method for producing a printed material according to the present invention includes: printing by an inkjet method using the ink composition for inkjet recording according to the present invention.

Further, a printing method according to the present invention includes: printing by an inkjet method using the ink composition for inkjet recording according to the present invention.

Advantageous Effects of Invention

According to the present invention, it is possible to provide an ink composition for inkjet recording which allows high-speed printing with low odor while maintaining the quality of a printed material, a method for producing a printed material and a printing method by using the ink composition for inkjet recording.

DESCRIPTION OF EMBODIMENTS

Hereinbelow, detailed explanations are given for the ink composition for inkjet recording of the present invention, a method for producing a printed material, and a printing method in order.

Incidentally, in the present invention, "(meth)acrylic" means any of acrylic and methacrylic, and "(meth)acrylate" means acrylate or methacrylate.

1. Ink composition for inkjet recording

An ink composition for inkjet recording according to the present invention includes: a color material, a binder resin, and an organic solvent, wherein the binder resin contains at least an acrylic-based resin (A), and a copolymer (B) having a constitutional unit derived from a hydroxyalkyl (meth)acrylate, a constitutional unit represented by the following general formula (I), and a constitutional unit represented by the following general formula (H), a content ratio by mass of the acrylic-based resin (A) to the copolymer (B) ((A)/(B)) is 25/75 or more and 70/30 or less, and wherein the organic solvent contains at least a polyalkylene glycol dialkyl ether and a cyclic ester, a content ratio of the cyclic ester is 3 parts by mass or more and 10 parts by mass or less relative to 100 parts by mass of the ink composition, and a content ratio of the ethylene glycol alkyl ether acetate is 5 parts by mass or less relative to 100 parts by mass of the ink composition:

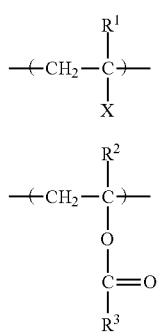

(I)

(II)

wherein each of $R^1$ and $R^2$ is independently a hydrogen atom, or a methyl group; $R^3$ is an alkyl group having 1 to 3 carbon atoms; and X is a halogen atom.

In the ink composition for inkjet recording of the present invention, the acrylic-based resin (A) and the above specific copolymer (B) are used at a specific ratio as the binder resin, and the polyalkylene glycol dialkyl ether and a specific amount of the cyclic ester are used in combination as the organic solvent. Further, the color material, the above specific binder resin, and the above specific organic solvent are used in combination and the content ratio of the ethylene glycol alkyl ether acetate is 5 parts by mass or less relative to 100 parts by mass of the ink composition. Accordingly, an ink composition for inkjet recording which allows high-speed printing with low odor while maintaining the quality of a printed material can be obtained.

As described in Patent Literature 1 and Patent Literature 2 above, a mixed solvent containing ethylene glycol monobutyl ether acetate or cyclic ester such as γ-butyrolactone at high ratio is used as a solvent in the ink composition of a related art. However, a problem of strong odor is caused when such an ink composition is applied to high-speed printing.

To have an ink composition suitable for high-speed printing, the inventors of the present invention conducted a study for lowering the ratio of ethylene glycol alkyl ether acetate and cyclic ester which cause odor. However, a solvent not containing an ethylene glycol alkyl ether acetate and a cyclic ester has poor solubility for a vinyl chloride-vinyl acetate copolymer. An ink composition having a low content ratio of a vinyl chloride-vinyl acetate copolymer yields a printed material which has low optical density and poor alcohol resistance and stretchability. Furthermore, an ink in which a solvent not containing an ethylene glycol alkyl ether acetate and a cyclic ester is used easily exhibits a clogging in a printer nozzle, and exhibits a poor intermittent ejection property, in particular.

Based on the above knowledge, the inventors of the present invention conducted further studies, and as a result, it was found that, when a mixed solvent in which a polyalkylene glycol dialkyl ether and a cyclic ester are contained as an organic solvent and a content ratio of the cyclic ester is 3 parts by mass or more and 10 parts by mass or less relative to 100 parts by mass of the ink composition and the content ratio of ethylene glycol alkyl ether acetate is 5 parts by mass or less relative to 100 parts by mass of the ink composition is used, low odor and an excellent intermittent ejection property can be obtained and also the solubility of a binder resin can be improved. Furthermore, in the present invention, to increase the solubility for the above mixed solvent, the copolymer (B) having a constitutional unit derived from a hydroxyalkyl (meth)acrylate, a constitutional unit represented by the general formula (I), and a constitutional unit represented by the general formula (II) and the acrylic-based resin (A) having high solubility in the above mixed solvent are used in combination. Because the copolymer (B) has better solubility in the mixed solvent compared to a vinyl chloride-vinyl acetate copolymer of a related art, the binder resin can be sufficiently dissolved even in the mixed solvent in which the content of the ethylene glycol alkyl ether acetate and the cyclic ester is low. Furthermore, by setting the content ratio by mass of the acrylic-based resin (A) to the copolymer (B) ((A)/(B)) at 25/75 or more and 70/30 or less, an excellent ejection stability and an excellent intermittent ejection property are obtained even when it is applied to high-speed printing and also a wettability of an ink on a recording medium is excellent, a drying property of an obtained coating film is excellent, and an obtained printed material has high quality due to high optical density as well as excellent alcohol resistance and stretchability.

As described above, with the ink composition for inkjet recording of the present invention, an ink composition for inkjet recording allowing high-speed printing with low odor while maintaining the quality of a printed material can be obtained.

The ink composition for inkjet recording of the present invention contains at least a color material, a binder resin, and an organic solvent, and within a range in which the effect of the present invention is not impaired affected, it may contain other component, if necessary. Hereinbelow, each component of the ink composition for inkjet recording of the present invention is explained in order.

[Organic Solvent]

In the ink composition for inkjet recording of the present invention, as an organic solvent, a mixed solvent containing at least a polyalkylene glycol dialkyl ether and a cyclic ester in which the content ratio of the cyclic ester is 3 parts by mass or more and 10 parts by mass or less relative to 100 parts by mass of the ink composition is used. By containing the organic solvent with the above composition, low odor and an excellent intermittent ejection property can be obtained, and the below-mentioned binder resin can be dissolved by it.

Furthermore, while the organic solvent of the present invention contains at least a polyalkylene glycol dialkyl ether and a cyclic ester, it may also contain other organic solvent, if necessary.

Incidentally, as described in the present invention, the organic solvent is a liquid at least at room temperature (25° C.)

<Polyalkylene Glycol Dialkyl Ether>

In the present invention, a polyalkylene glycol dialkyl ether can be suitably selected from those known in the field as a solvent. By using polyalkylene glycol dialkyl ether, an ink composition with low odor can be provided, and an ink composition for inkjet recording allowing high-speed printing while maintaining the quality of a printed material can be provided.

According to the present invention, as for the polyalkylene glycol dialkyl ether, polyalkylene glycol dialkyl ether represented by the following general formula (IV) is preferable from the viewpoint of having high-speed printing while maintaining the quality of a printed material.

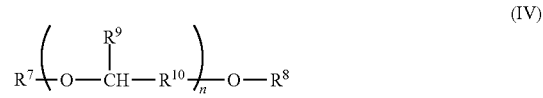

In the general formula (IV), each of $R^7$ and $R^8$ is independently an alkyl group having 1 to 4 carbon atoms, $R^9$ is a hydrogen atom or a methyl group, $R^{10}$ is a methylene group or an ethylene group, and n is an integer of 2 or more and 4 or less; a plurality of $R^9$s can be the same or different; and a plurality of $R^{10}$s can be the same or different.

Examples of the alkyl group having 1 to 4 carbon atoms in $R^7$ and $R^8$ include a methyl group, an ethyl group, a propyl group, and a butyl group. Among them, it is preferably a methyl group or an ethyl group.

n is an integer of 2 or more and 4 or less, among them, n is preferably an integer of 2 or more and 3 or less. More preferably, n is 2.

Specific examples of the polyalkylene glycol dialkyl ether represented by the general formula (IV) include diethylene glycol dimethyl ether, triethylene glycol dimethyl ether, diethylene glycol methylethyl ether, diethylene glycol diethyl ether, diethylene glycol dibutyl ether, and dipropylene glycol dimethyl ether. From the viewpoint of having high-speed printing with low odor while maintaining the quality of a printed material, diethylene glycol diethyl ether or diethylene glycol methylethyl ether is preferable among them.

The polyalkylene glycol dialkyl ether may be used either singly or in combination of two or more kinds.

In the ink composition for inkjet recording of the present invention, the content ratio of polyalkylene glycol dialkyl ether is not particularly limited, and it can be suitably adjusted. However, from the viewpoint of having high-speed printing with low odor while maintaining the quality of a printed material, it is preferably 50 parts by mass or more and 85 parts by mass or less, and more preferably 60 parts by mass or more and 80 parts by mass or less relative to 100 parts by mass of the ink composition.

<Cyclic Ester>

In the ink composition for inkjet recording of the present invention, the cyclic ester is used in the range of 3 parts by mass or more and 10 parts by mass or less relative to 100 parts by mass of the ink composition. In the present invention, the cyclic ester indicates a product having a cyclic structure which is formed by dehydration condensation between a hydroxyl group and a carboxy group in the same molecule.

As the cyclic ester is used at 3 parts by mass or more, the solubility of the below-mentioned binder resin is enhanced and an ink with an excellent intermittent ejection property or ejection stability can be provided. Furthermore, as the cyclic ester is used at 10 parts by mass or less, low odor and an excellent drying property can be obtained, and as the wettability of an ink on a recording medium is improved, a printed material with high optical density and high quality can be obtained.

According to the present invention, the content ratio of cyclic ether is preferably 3.5 parts by mass or more and 9.5 parts by mass or less, and more preferably 4 parts by mass or more and 9 parts by mass or less relative to 100 parts by mass of the ink composition.

In particular, when it is important to have a high drying property of an ink, a high wettability and high optical density in order to obtain a printed material with high quality by high-speed printing, the content ratio of cyclic ether is preferably 3 parts by mass or more and 6 parts by mass or less, more preferably 3.5 parts by mass or more and 5.5 parts by mass or less, and even more preferably 4 parts by mass or more and 5 parts by mass or less relative to 100 parts by mass of the ink composition.

Meanwhile, when it is important to improve intermittent ejection property and ejection stability in order to obtain an ink that is more suitable for an inkjet method, the content ratio of cyclic ether is preferably 6 parts by mass or more and 10 parts by mass or less, more preferably 6.5 parts by mass or more and 9.5 parts by mass or less, and even more preferably 7 parts by mass or more and 9 parts by mass or less relative to 100 parts by mass of the ink composition.

In the present invention, the cyclic ester can be suitably selected from those known in the field as a solvent. From the viewpoint of having an excellent intermittent ejection property, a cyclic ester having 4- to 7-membered ring structure is preferable, in particular. A cyclic ester having 5- to 7-membered ring structure is more preferable.

Specific examples of the cyclic ester include β-propiolactone, γ-butyrolactone, δ-valerolactone, and ε-caprolactone.

The cyclic ester may be used either singly or in combination of two or more kinds.

<Other Solvent>

The ink composition for inkjet recording of the present invention may contain other solvent within a range in which the effect of the present invention is not impaired. As for the other solvent, it can be suitably selected from solvents which do not react with each component in the ink composition, and which are able to dissolve or dispense the each component.

As for the other solvent, polyalkylene glycol alkyl ether represented by the general formula (III) can be mentioned as a preferred example. By using polyalkylene glycol alkyl ether represented by the following general formula (III), an excellent intermittent ejection property and an improved wettability of an ink on a recording medium are achieved so that a printed material with high quality can be obtained.

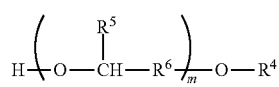

(III)

In the general formula (III) $R^4$ is an alkyl group having 1 to 4 carbon atoms; $R^5$ is a hydrogen atom, or a methyl group; $R^6$ is a methylene group or an ethylene group; and m is an integer of 2 or more and 4 or less; a plurality of $R^5$s can be the same or different; and a plurality of $R^6$s can be the same or different.

Examples of the alkyl group having 1 to 4 carbon atoms in $R^4$ and $R^5$ include a methyl group, an ethyl group, a propyl group, and a butyl group. Among them, it is preferably a methyl group or an ethyl group.

m is an integer of 2 or more and 4 or less, among them, and m is preferably an integer of 2 or more and 3 or less.

As for the polyalkylene glycol dialkyl ether represented by the general formula (III), dipropylene glycol monomethyl ether, tripropylene glycol monomethyl ether, triethylene glycol monomethyl ether, or triethylene glycol monobutyl ether is preferable, in particular, from the viewpoint of having an excellent intermittent ejection property, and an improved wettability of an ink on a recording medium, and obtaining a printed material with high quality due to high optical density.

The polyalkylene glycol dialkyl ether represented by the general formula (III) may be used either singly or in combination of two or more kinds.

When the polyalkylene glycol dialkyl ether represented by the general formula (III) is used in the ink composition for inkjet recording of the present invention, the content ratio is not particularly limited. However, from the viewpoint of having high-speed printing with low odor while maintaining the quality of a printed material, it is preferably 3 parts by mass or more and 15 parts by mass or less, more preferably 4 parts by mass or more and 14 parts by mass or less, and even more preferably 4 parts by mass or more and 10 parts by mass or less relative to 100 parts by mass of the ink composition.

In particular, when it is important to have a good drying property of an ink in order to obtain an ink that is suitable for high-speed printing, the content ratio of the polyalkylene glycol dialkyl ether represented by the general formula (III) is preferably 3 parts by mass or more and 6 parts by mass or less, more preferably 3.5 parts by mass or more and 5.5 parts by mass or less, and even more preferably 4 parts by mass or more and 5 parts by mass or less relative to 100 parts by mass of the ink composition.

Meanwhile, when it is important to have an improved intermittent ejection property in order to obtain an ink that is more suitable for an inkjet method, the content ratio of polyalkylene glycol alkyl ether is preferably 6 parts by mass or more and 15 parts by mass or less, and more preferably 6.5 parts by mass or more and 14 parts by mass or less. For having an excellent intermittent ejection property and even lower odor, it is more preferably 7 parts by mass or more and 10 parts by mass or less.

Furthermore, the ink composition for inkjet recording of the present invention may contain ethylene glycol alkyl ether acetate at content ratio of 5 parts by mass or less relative to 100 parts by mass of the ink composition. By containing it within the aforementioned range, low odor can be surely obtained even under high-speed printing. By containing ethylene glycol alkyl ether acetate, the solubility of a binder resin can be increased or the intermittent ejection property can be improved. Meanwhile, from the viewpoint of lowering the odor during drying of a coating film of the ink composition, the content ratio of ethylene glycol alkyl ether acetate is preferably 3 parts by mass or less, and more preferably 1 part by mass or less relative to 100 parts by mass of the ink composition. Even more preferably, it is substantially not contained.

Incidentally, specific examples of ethylene glycol alkyl ether acetate include ethylene glycol monomethyl ether acetate, ethylene glycol monoethyl ether acetate, and ethylene glycol monobutyl ether acetate.

Furthermore, the ink composition for inkjet recording of the present invention may contain, as an organic solvent, polyethylene glycol alkyl ether acetate, propylene glycol alkyl ether acetate, or polypropylene glycol alkyl ether acetate. By using those solvents, the solubility of the binder resin described below can be improved and the ejection stability or intermittent ejection property can be also improved.

Specific examples of the polyethylene glycol alkyl ether acetate include diethylene glycol methyl ether acetate, diethylene glycol ethyl ether acetate, diethylene glycol butyl ether acetate, triethylene glycol methyl ether acetate, triethylene glycol ethyl ether acetate, and triethylene glycol butyl ether acetate.

Specific examples of the propylene glycol alkyl ether acetate include propylene glycol methyl ether acetate, propylene glycol ethyl ether acetate, and propylene glycol butyl ether acetate.

Furthermore, specific examples of the polypropylene glycol alkyl ether acetate include dipropylene glycol methyl ether acetate, dipropylene glycol ethyl ether acetate, dipropylene glycol butyl ether acetate, tripropylene glycol methyl ether acetate, tripropylene glycol ethyl ether acetate, and tripropylene glycol butyl ether acetate.

From the viewpoint of lowering the odor during drying of a coating film, the content ratio of polyethylene glycol alkyl ether acetate is preferably 2 parts by mass or less, and more preferably 1 part by mass or less relative to 100 parts by mass of the ink composition. Even more preferably, it is substantially not contained.

From the viewpoint of lowering the odor during drying of a coating film, the content ratio of propylene glycol alkyl ether acetate is preferably 5 parts by mass or less, and more preferably 3 parts by mass or less relative to 100 parts by mass of the ink composition. Even more preferably, it is substantially not contained.

Furthermore, from the viewpoint of lowering the odor during drying of a coating film, the content ratio of polypropylene glycol alkyl ether acetate is preferably 2 parts by mass or less, and more preferably 1 part by mass or less relative to 100 parts by mass of the ink composition. Even more preferably, it is substantially not contained.

In the ink composition for inkjet recording of the present invention, the total content of the organic solvent can be suitably adjusted. However, the total content of the organic solvent is preferably 40 parts by mass or more and 95 parts by mass or less, more preferably 50 parts by mass or more and 90 parts by mass or less, and even more preferably 55 parts by mass or more and 88 parts by mass or less relative to 100 parts by mass of the whole ink composition.

When the total content of the organic solvent is the same or greater than the above lower limit, an excellent ejection stability or intermittent ejection property is obtained so that an ink composition suitable for high-speed printing can be provided. Furthermore, when the total content of the organic solvent is the same or lower than the above upper limit, low odor and an excellent drying property of a coating film can be obtained and also the wettability of an ink is inhibited while the optical density of a printed material is increased, and thus a printed material with high quality can be provided.

[Binder Resin]

The ink composition for inkjet recording of the present invention, as a binder resin, contains at least the acrylic-based resin (A) and the copolymer (B) having a constitutional unit derived from a hydroxyalkyl (meth)acrylate, a constitutional unit represented by the following general formula (I), and a constitutional unit represented by the following general formula (II), in which the acrylic-based resin (A) and the copolymer (B) are used in combination, and a content ratio by mass of the acrylic-based resin (A) to the copolymer (B) ((A)/(B)) is 25/75 or more and 70/30 or less.

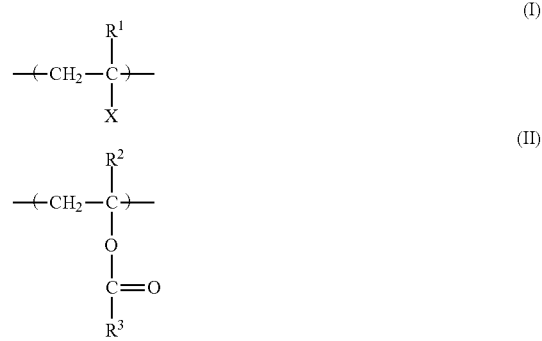

In the general formulae (I) and (II), each of $R^1$ and $R^2$ is independently a hydrogen atom, or a methyl group; $R^3$ is an alkyl group having 1 to 3 carbon atoms; and X is a halogen atom.

By using the binder resin in the above specific combination, not only an excellent ejection stability or intermittent ejection property is obtained even at the time of application to high-speed printing but also the wettability of an ink on a recording medium is excellent, the drying property of a coating film to be obtained is excellent, and a printed material to be obtained has excellent alcohol resistance and stretchability as well as high quality due to high optical density.

The binder resin of the present invention contains at least the acrylic-based resin (A) and the copolymer (B) described above, and within a range in which the effect of the present invention is not impaired, it may contain other binder resin, if necessary.

<Acrylic-based Resin (A)>

The acrylic-based resin (A) used in the present invention indicates a polymer compound which includes a polymer having, as a monomer, at least one selected from (meth) acrylic acid and a derivative thereof. However, the acrylic-based resin (A) is different from the copolymer (B) described below, and the acrylic-based resin (A) does not include the copolymer (B) described below. The acrylic-based resin (A) preferably does not contain a constitutional unit derived from alkyl (meth)acrylate having a hydroxyl group. Furthermore, from the viewpoint of inhibiting clogging in a nozzle part of an inkjet head due to unlikeliness of having an increase in viscosity during volatilization, the acrylic-based resin (A) of the present invention preferably does not contain at least one of the constitutional unit represented by the above general formula (I) and the constitutional unit represented by the above general formula (II).

In the acrylic-based resin (A), a constitutional unit derived from a compound having an ethylenic double bond, which can polymerize with (meth)acrylic acid and a derivative thereof, may be further contained.

Because the acrylic-based resin (A) is combined as a binder resin with the above organic solvent in the present invention, an increase in viscosity is unlikely to occur during volatilization so that clogging in a nozzle part of an inkjet head is inhibited. Accordingly, high ejection responsiveness can be achieved during high-speed printing and good liquid shape is obtained after ejection, and as a result, it is not likely to have scattering of an ink or mismatched landing position.

Furthermore, by using the acrylic-based resin (A) as a binder resin, the tackiness after printing is inhibited so that offset or stickiness after winding and drying can be prevented.

The acrylic-based resin (A) can preferably be obtained from a radical polymerizable monomer which is selected from a group consisting of alkyl (meth)acrylate, aralkyl (meth)alkylate, alkoxyalkyl (meth)acrylate, hydroxyalkyl (meth)acrylate, and (meth)acrylic acid. Various monomers can be used if they are a radical polymerizable monomer which has at least one radical polymerizable ethylenic double bond in the molecule, preferably one radical polymerizable ethylenic double bond in the molecule, and can be polymerized in the presence of a radical polymerization initiator in solvent. For example, a vinyl compound or maleimides may be contained as a radical polymerizable monomer.

The acrylic-based resin (A) may be any one of a homopolymer consisting of one radical polymerizable monomer and a copolymer in which two or more radical polymerizable monomers are selected and used.

Examples of the radical polymerizable monomer for forming the acrylic-based resin (A) include (meth)acrylic acid; (meth)acrylates such as methyl (meth)acrylate, ethyl (meth)acrylate, butyl (meth)acrylate, benzyl (meth)acrylate, phenethyl (meth)acrylate, methoxymethyl (meth)acrylate, methoxyethyl (meth)acrylate, butoxyethyl (meth)acrylate, 2-methylcyclohexyl (meth)acrylate, 2-hydroxyethyl (meth)acrylate, 2-hydroxypropyl (meth)acrylate, or trifluoroethyl (meth)acrylate; (meth)acrylamides such as (meth)acrylamide, dimethyl (meth)acrylamide, diethyl (meth)acrylamide, dibutyl (meth)acrylamide, phenyl (meth)acrylamide, or benzyl (meth)acrylamide; vinyl compounds such as styrene, $\alpha$-, o-, m-, p-alkyl, nitro, cyano, amide, ester derivatives of styrene, (meth)acrylic acid anilide, (meth)acrylonitrile, acrolein, vinyl chloride, vinylidene chloride, vinyl fluoride, vinylidene fluoride, N-vinyl pyrrolidone, vinyl pyridine, N-vinyl carbazole, vinyl imidazole, or vinyl acetate; monomaleimides such as N-benzylmaleimide, N-phenylmaleimide, N-cyclohexylmaleimide, N-laurinmaleimide, or N-(4-hydroxyphenyl)maleimide; and phthalimides such as N-(meth)acryloyl phthalimide.

In the present invention, from the viewpoint of having an excellent ejection stability of an ink composition and an excellent drying property of an ink on a recording medium, a monomer having no hydroxyl group is preferably used among the above monomers. It is more preferable to use a monomer having no amino group and no hydroxyl group.

The content ratio of (meth)acrylic acid and a derivative thereof as a monomer for forming the acrylic-based resin (A) is, from the viewpoint of having an excellent ejection stability of an ink composition and an excellent drying property of an ink on a recording medium, preferably 70 parts by mass or more, more preferably 80 parts by mass or more, and even more preferably 90 parts by mass or more, relative to 100 parts by mass of the monomer for forming the acrylic resin.

Particularly preferred acrylic-based resin (A) is a homopolymer of methyl (meth)acrylate or a copolymer of methyl(meth)acrylate and at least one compound selected from a group consisting of butyl (meth)acrylate, ethoxyethyl (meth)acrylate, and benzyl (meth)acrylate. In particular, a homopolymer of methyl (meth)acrylate or a copolymer of methyl (meth)acrylate and butyl (meth)acrylate is more preferable. In a monomer for forming the copolymer, total amount of at least one compound selected from a group consisting of butyl (meth)acrylate, ethoxyethyl (meth)acrylate, and benzyl (meth)acrylate is preferably 0.01 to 15 parts by mass, more preferably 0.1 to 15 parts by mass, and even more preferably 0.5 to 12 parts by mass relative to 100 parts by mass of methyl (meth)acrylate. Such acrylic-based resin (A) has an excellent ejection stability and drying property so that an ink composition for inkjet recording that is suitable for high-speed printing can be provided.

From the viewpoint of having an excellent ejection stability of an ink composition and an excellent drying property of an ink on a recording medium, mass average molecular weight of the acrylic-based resin (A) to be used in the present invention is preferably 10,000 or more, and more preferably in the range of 10,000 or more and 150,000 or less. It is even more preferably 10,000 or more and 70,000 or less.

Incidentally, the mass average molecular weight in the present invention indicates a value measured by gel permeation chromatography (GPC) (for example, "HLC-8220GPC" manufactured by TOSOH CORPORATION) using polystyrene as a standard.

Furthermore, from the viewpoint of having an excellent ejection stability of an ink composition and an excellent drying property of an ink on a recording medium, the acrylic-based resin (A) used in the present invention preferably has glass transition temperature (Tg) of 40° C. or higher. The glass transition temperature (Tg) of 70° C. or higher is more preferable.

In the present invention, the glass transition temperature (Tg) indicates a value which is measured by differential scanning calorimeter (DSC) (for example, differential scanning calorimeter "DSC-50" manufactured by SHIMADZU CORPORATION). Although there may be a case in which plural glass transition temperatures are observed, a major transition temperature with high heat absorption amount is employed in the present invention.

In the present invention, the acid value of the acrylic-based resin (A) is not particularly limited. However, from the viewpoint of having an excellent ejection stability of an ink composition and an excellent drying property of an ink on a recording medium, the acid value of the resin is preferably 10 mgKOH/g or less, and more preferably 5 mgKOH/g or less.

Incidentally, the acid value as described in the present invention indicates mass (mg) of potassium hydroxide which is required for neutralizing an acidic component contained in 1 g of a sample (i.e., solid component in the resin), and it is a value measured with reference to the method described in JIS K 0070.

In the present invention, the amine value of the acrylic-based resin (A) is not particularly limited. However, from the viewpoint of having an excellent ejection stability of an ink composition and an excellent drying property of an ink on a recording medium, it is preferably 10 mgKOH/g or less, more preferably 5 mgKOH/g or less, and even more preferably 2 mgKOH/g or less.

Incidentally, the amine value as described herein indicates mass (mg) of potassium hydroxide which is an equivalent amount of hydrochloric acid amount required for neutralizing 1 g of a solid component contained in the resin, and it is a value measured with reference to the method described in JIS K 7237.

Furthermore, in the present invention, the hydroxy value the acrylic-based resin (A) is not particularly limited, but from the viewpoint of having an excellent ejection stability of an ink composition and an excellent drying property of an ink on a recording medium, it is preferably 10 mgKOH/g or less, more preferably 5 mgKOH/g or less, and even more preferably 2 mgKOH/g or less.

Incidentally, the hydroxy value described in the present invention indicates mg of potassium hydroxide that is required for acetylating a OH group contained in 1 g of a solid component in the resin, and it is a value measured with reference to the method described in JIS K 0070, i.e., a OH group in a sample is acetylated by using acetic acid anhydride and unused acetic acid is neutralized by potassium hydroxide.

Incidentally, the acid value, amine value, and hydroxy value can be suitably adjusted based on the type or content ratio of the monomer for forming the resin.

As for the radical polymerization initiator which is used for preparing the acrylic-based resin (A) used in the present invention, organic peroxides are preferable, and examples thereof include hydroperoxide type, dialkyl peroxide type, peroxyester type, diacyl peroxide type, peroxy carbonate type, peroxy ketal type, and ketone peroxide type organic peroxides. Among them, organic peroxides such as dialkylperoxide type, peroxyester type, and diacyl peroxide type are preferable because the compatibility of the acrylic resin in the above mixed solvent can be enhanced as a reaction product having a solvent bound to the terminal is obtained as described above. Specific examples of the preferred include t-butylperoxy-2-ethylhexanoate, t-butyl hydroperoxide, and di-t-hexyl peroxide, but not limited thereto.

The polymer and copolymer used as the acrylic-based resin (A) may be used either singly or in combination of two or more kinds.

Furthermore, examples of the commercially available acrylic-based resin (A) include "PARALOID B99N" (methyl methacrylate-butyl methacrylate copolymer, Tg of 82° C., mass average molecular weight of 15,000) and "PARALOID B60" (methyl methacrylate-butyl methacrylate copolymer, Tg of 75° C., mass average molecular weight of 50,000) that are manufactured by Rohm and Haas.

<Copolymer (B) Having Constitutional Unit Derived from a hydroxyalkyl (meth)acrylate, Constitutional Unit represented by the general formula (I), and constitutional Unit Represented by the General Formula (II)>

The ink composition for inkjet recording of the present invention contains the copolymer (B) which has, as a binder resin, a constitutional unit derived from a hydroxyalkyl (meth)acrylate, a constitutional unit represented by the following general formula (I), and a constitutional unit represented by the following general formula (II).

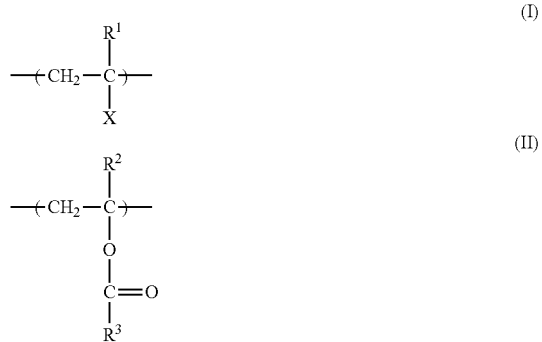

In the general formulae (I) and (II), each of $R^1$ and $R^2$ is independently a hydrogen atom, or a methyl group; $R^3$ is an alkyl group having 1 to 3 carbon atoms; and X is a halogen atom.

By containing the copolymer (B), not only an excellent ejection stability of an ink composition and improved wettability of an ink on a recording medium are obtained but also a printed material having high optical density and excellent stretchability can be obtained.

The copolymer (B) of the present invention has at least a constitutional unit derived from a hydroxyalkyl (meth)acrylate, a constitutional unit represented by the general formula (I), and a constitutional unit represented by the general formula (II), and it may have other constitutional unit, if necessary.

Hereinbelow, explanations for the copolymer (B) are given in order.

As for the hydroxyalkyl (meth)acrylate for forming the copolymer (B), it can be suitably selected from hydroxyalkyl (meth)acrylates that are known in the field. Among them, from the viewpoint of having an excellent ejection stability of an ink composition and improved wettability of an ink on a recording medium and also obtaining a printed material having high optical density and excellent stretchability, 2-hydroxyethyl (meth)acrylate, 2-hydroxypropyl (meth)acrylate, 1,2-propanediol 2-(meth)acrylate, methyl α-(hydroxymethyl) (meth)acrylate, ethyl α-(hydroxymethyl)(meth)acrylate, n-butyl α-(hydroxymethyl) (meth)acrylate, 1,4-cyclohexane dimethanol mono(meth)acrylate, or 4-hydroxybutyl (meth)acrylate is preferable. Among them, 2-hydroxypropyl (meth)acrylate or 1,2-propanediol 2-(meth)acrylate is preferable. The hydroxyalkyl (meth)acrylate can be used either singly or in combination of two or more kinds.

Examples of the halogen atom for X in the general formula (I) include a fluorine atom, a chlorine atom, a bromine atom, and an iodine atom. It is preferably a chlorine atom or a bromine atom, and more preferably a chlorine atom.

Specific examples of the monomer for forming the constitutional unit represented by the general formula (I) include vinyl chloride, vinyl bromide, isopropenyl chloride, and isopropenyl bromide. From the viewpoint of having an excellent ejection stability of an ink composition and improved wettability of an ink on a recording medium and also obtaining a printed material having high optical density and excellent stretchability, vinyl chloride or isopropenyl chloride is preferable among them. Vinyl chloride is more preferable.

Examples of the alkyl group for $R^3$ in the general formula (II) include a methyl group, an ethyl group, an n-propyl group, and an isopropyl group. Among them, it is preferably a methyl group or an ethyl group. A methyl group is more preferable.

Specific examples of the monomer for forming the constitutional unit represented by the general formula (II) include vinyl acetate, vinyl propionate, vinyl butyrate, vinyl isobutyrate, isopropenyl acetate, isopropenyl propionate, isopropenyl butyrate, and isopropenyl isobutyrate. From the viewpoint of having an excellent ejection stability of an ink composition and improved wettability of an ink on a recording medium and also obtaining a printed material having high optical density and excellent stretchability, vinyl acetate or isopropenyl acetate is preferable among them. Vinyl acetate is more preferable.

Other monomer for forming the copolymer (B) can be suitably selected from the monomers that are well known in the field. For example, as exemplified above as a monomer for forming the acrylic-based resin (A), a (meth)acrylate monomer having no functional group and other monomers can be suitably used.

According to the present invention, it is preferable that the copolymer (B) has the constitutional unit represented by the general formula (I) as a main component. Among them, from the viewpoint of having an excellent ejection stability of an ink composition and an improved wettability of an ink on a recording medium and obtaining a printed material having high optical density, excellent adhesiveness to a recording medium, and excellent alcohol resistance and stretchability, the ratio of the constitutional unit represented by the general formula (I) is preferably 70% by mass or more 95% by mass or less, and more preferably 75% by mass or more 90% by mass or less relative to the total of the whole constitutional units for forming the copolymer (B).

The ratio of the constitutional unit represented by the general formula (II) for forming the copolymer (B) is preferably 4% by mass or more 10% by mass or less, and more preferably 5% by mass or more 8% by mass or less.

Furthermore, the ratio of the hydroxyalkyl (meth)acrylate for forming the copolymer (B) is preferably 1% by mass or more and 20% by mass or less, and more preferably 5% by mass or more and 17% by mass or less. When the constitutional unit derived from a hydroxyalkyl (meth)acrylate is present at the same or higher than the above lower limit, the solubility to the above solvent composition can be improved. Furthermore, when it is present at the same or lower than the above upper limit, the blocking which occurs during winding after printing can be inhibited.

Incidentally, the main component as described in the present invention indicates a constitutional unit which is present at 50% by mass or more relative to the total of the whole constitutional units for forming the copolymer (B).

Furthermore, from the viewpoint of having an excellent ejection stability of an ink composition and an improved wettability of an ink on a recording medium and obtaining a printed material having high optical density, excellent adhesiveness to a recording medium, and excellent alcohol resistance and stretchability, the total ratio of the constitutional unit derived from a hydroxyalkyl (meth)acrylate, constitutional unit represented by the general formula (I), and constitutional unit represented by the general formula (II) is preferably 80% by mass or more, and more preferably 90% by mass or more relative to the total of the whole constitutional units for forming the copolymer (B). Even more preferably, it is substantially 100% by mass.

The number average molecular weight of the copolymer (B) used in the present invention can be suitably selected and it is not particularly limited. However, from the viewpoint of having an excellent ejection stability of an ink composition and an excellent wettability of an ink on a recording medium and obtaining a printed material having high optical density and excellent stretchability, the number average molecular weight is preferably 10,000 or more, and more preferably in the range of 10,000 or more and 50,000 or less, and even more preferably 10,000 or more and 30,000 or less.

In particular, from the viewpoint of obtaining a printed material having high optical density and excellent ethanol resistance and stretchability, the number average molecular weight of the copolymer (B) is preferably 15,000 or more, and more preferably 19,000 or more and 50,000 or less, and even more preferably 20,000 or more and 48,000 or less. Meanwhile, from the viewpoint of having an excellent intermittent ejection property, in particular, the number average molecular weight of the copolymer (B) is preferably 30,000 or less, and more preferably 10,000 or more and 25,000 or less, and even more preferably 12,000 or more and 2000 or less.

Incidentally, the number average molecular weight in the present invention indicates a value measured by gel permeation chromatography (GPC) (for example, "HLC-8220GPC" manufactured by TOSOH CORPORATION) using polystyrene as a standard.

Furthermore, from the viewpoint of having an excellent ejection stability of an ink composition and an excellent wettability of an ink on a recording medium and obtaining a printed material having high optical density and excellent stretchability, the copolymer (B) preferably has glass transition temperature (Tg) of 40° C. or higher. The glass transition temperature (Tg) of 50° C. or higher is more preferable.

Examples of commercially available copolymer (B) include "SOLBIN TA3" (copolymer of vinyl chloride 83% by mass, vinyl acetate 4% by mass, and hydroxyalkyl acrylate 13% by mass, Tg of 65° C., number average molecular weight of 24,000) manufactured by Nissin Chemical Industry Co., Ltd.) and "SOLBIN TA2" (copolymer of vinyl chloride 83% by mass, vinyl acetate 4% by mass, and hydroxyalkyl acrylate 13% by mass, Tg of 70° C., number average molecular weight of 33,000) manufactured by Nissin Chemical Industry Co., Ltd.

As the acrylic-based resin (A) and the copolymer (B) are used in combination to the extent that the content ratio by mass of the acrylic-based resin (A) to the copolymer (B) ((A)/(B)) is 25/75 or more and 70/30 or less in the ink composition for inkjet recording of the present invention, an excellent ejection stability and excellent intermittent ejection property are obtained even when it is applied to high-speed printing and also a wettability of an ink on a recording medium is excellent, a drying property of an obtained coating film is excellent, an obtained printed material has not only high quality due to high optical density but also excellent alcohol resistance and stretchability. Among them, from the viewpoint of the drying property, the content ratio by mass of the acrylic-based resin (A) to the copolymer (B) ((A)/(B)) is 40/60 or more and 70/30 or less, and more preferably 40/60 or more and 60/40 or less.

Furthermore, when it is desired to have an ink composition with more excellent intermittent ejection property, the ink composition for inkjet recording of the present invention has the copolymer (B) of which number average molecular weight is 30,000 or less, and preferably 10,000 or more and 20,000 or less and the content ratio by mass of the acrylic-based resin (A) to the copolymer (B) ((A)/(B)) is 25/75 or more and 70/30 or less, and preferably 25/75 or more and 40/60 or less.

The binder resin of the present invention may contain other resin within a range in which the effect of the present invention is not impaired. Preferred examples of the other resin include a vinyl chloride-vinyl acetate copolymer which is conventionally known in the field.

From the viewpoint of having an excellent ejection stability and excellent intermittent ejection property even when applied to high-speed printing, having an excellent wettability of an ink on a recording medium, an excellent drying property of an obtained coating film, and obtaining a printed material with high quality due to high optical density and also excellent alcohol resistance and stretchability, the other resin is preferably contained at 20 parts by mass or less, and more preferably at 10 parts by mass or less relative to 100 parts by mass of the whole amount of the binder resin. Namely, the total amount of the acrylic-based resin (A) and the copolymer (B) is preferably 80 parts by mass or more, and more preferably 90 parts by mass or more relative to 100 parts by mass of the whole amount of the binder resin.

The total content of the binder resin in the ink composition for inkjet recording of the present invention can be suitably adjusted. However, the total content of the binder resin is preferably 4.9 parts by mass or more and 50 parts by mass or less, more preferably 5 parts by mass or more and 30 parts by mass or less, and even more preferably 6 parts by mass or more and 25 parts by mass or less relative to 100 parts by mass of the whole amount of the ink composition.

When the total content of the organic solvent is the same or more than the aforementioned lower limit, an excellent ejection stability or an excellent intermittent ejection property is obtained so that an ink composition suitable for high-speed printing can be provided. Furthermore, as the total content of the organic solvent is the same or lower than the above upper limit, an excellent drying property of a coating film can be obtained with low odor, the wettability of an ink is inhibited, and a printed material with high quality can be obtained due to increased optical density of a printed material.

[Color Material]

The color material of the present invention can be suitably selected from known color materials that are used for an ink composition for inkjet recording, and examples thereof include a known dye, an organic pigment, and an inorganic pigment. Among them, from the viewpoint of coloring property or weather resistance, it is preferable to use a pigment.

Examples of the organic pigment include an insoluble azo pigment, a soluble azo pigment, a dye derivative, a phthalocyanine-based organic pigment, a quinacridone-based organic pigment, a perylene-based organic pigment, a dioxazine-based organic pigment, a nickel azo-based pigment, an isoindolinone-based organic pigment, a pyranthrone-based organic pigment, a thioindigo-based organic pigment, a condensation azo-based organic pigment, a benzimidazolone-based organic pigment, a quinophthalone-based organic pigment, an isoindoline-based organic pigment, a quinacridone-based solid solution pigment and a perylene-based solid solution pigment, and other pigments such as carbon black.

When the organic pigment is exemplified with Color Index (C.I.) number, examples thereof include C.I. Pigment Yellow 1, 2, 3, 12, 13, 14, 16, 17, 20, 24, 73, 74, 75, 83, 93, 95, 97, 98, 109, 110, 114, 117, 120, 125, 128, 129, 130, 137, 138, 139, 147, 148, 150, 151, 153, 154, 155, 166, 168, 180, 185, 213, 214; C.I. Pigment Red 5, 7, 9, 12, 48, 49, 52, 53, 57, 97, 112, 122, 123, 147, 149, 168, 177, 180, 184, 192, 202, 206, 209, 215, 216, 217, 220, 223, 224, 226, 227, 228, 238, 240, 242, 254; C.I. Pigment Orange 16, 36, 43, 51, 55, 59, 61, 64, 71; C.I. Pigment Violet 19, 23, 29, 30, 37, 40, 50; C.I. Pigment Blue 15, 15:1, 15:3, 15:4, 15:6, 16, 22, 60, 64; C.I. Pigment Green 7, 36, 58; and C.I. Pigment Brown 23, 25, 26.

Specific examples of the inorganic pigment barium sulfate, iron oxide, zinc oxide, barium carbonate, barium sulfate, silica, clay, talc, titanium oxide, calcium carbonate, synthetic mica, alumina, zinc flower, lead sulfate, yellow lead, zinc sulfide, Bengala (red iron oxide (III)), cadmium red, Ultramarine blue, Prussian blue, chrome oxide green, cobalt green, amber, titan black, synthetic iron black and an inorganic solid solution pigment.

The average dispersion particle diameter of the pigment is not particularly limited, if it allows obtainment of desired color. It may vary depending on type of a pigment used. However, from the viewpoint of having good pigment dispersion stability and sufficient coloring power, it is preferably in the range of 5 nm or more and 200 nm or less, and more preferably in the range of 30 nm or more and 150 nm or less. That is because, when the average dispersion particle diameter is equal to or lower than the upper limit value described above, it is unlikely to have clogging of a nozzle in an inkjet head and an image with high reproducibility and high evenness can be obtained to provide a printed material with high quality. That is because, when it is lower than the lower limit described above, the light resistance may be impaired.

The content of the pigment is not particularly limited if it allows forming of a desired image, and it can be suitably adjusted. Specifically, it is preferably in the range of 0.05 part by mass or more and 20 parts by mass or less, and more preferably in the range of 0.1 part by mass or more and 10 parts by mass or less relative to 100 parts by mass of the whole amount of the ink composition, although it may vary depending on the type of a pigment. That is because, as the content is within the above range, a good balance between the dispersion stability of the pigment and coloration power can be provided.

To disperse the above pigment, a dispersing agent may be used in combination in the present invention. As for the dispersing agent, it can be suitably selected from those conventionally used as a dispersing agent. Examples of the dispersing agent which may be used include a cationic, an anionic, a non-ionic, an amphoteric, a silicone-based, or a fluorine-based surfactant. Among the surfactants, a polymer surfactant (i.e., polymer dispersing agent) is preferable from the viewpoint of having fine dispersion.

Examples of the polymer dispersing agent include the followings: (co)polymers of unsaturated carboxylic esters such as polyacrylic ester; (partial) amine salts, (partial) ammonium salts, or (partial) alkylamine salts of (co)polymers of unsaturated carboxylic acids such as polyacrylic acid; (co)polymers of hydroxyl group-containing unsaturated carboxylic esters such as hydroxyl group-containing polyacrylic ester, and modified products thereof; polyurethanes; unsaturated polyamides; polysiloxanes; long-chain polyaminoamide phosphates; polyethyleneimine derivatives (amides obtained by reaction of poly(lower alkyleneimine) and a free carboxy group-containing polyester, and bases thereof); and polyallylamine derivatives (reaction products obtained by reaction of polyallylamine and one or more components selected from the group consisting of the following three compounds: a free carboxy group-containing polyester; a free carboxy group-containing polyamide; and a free carboxy group-containing co-condensate of ester and amide (polyester amide)). Among them, it is preferable to use a polyester-based dispersing agent.

When the pigment is dispersed by using the above dispersion agent, the dispersing agent is preferably 20 parts by mass or more and 150 parts by mass or less, and more preferably 40 parts by mass or more and 120 parts by mass or less relative to 100 parts by mass of the pigment. When it is within the above range, an excellent dispersion property and excellent dispersion stability are obtained.

<Optional Additive Components>

If necessary, the ink composition for inkjet recording of the present invention may contain various additives within a range in which the effect of the present invention is not impaired.

Examples of the additives include an anti-oxidant, a surfactant, an anti-foaming agent, a pH modifying agent, and a viscosity modifying agent.

[Method for Producing Ink Composition for Inkjet Recording]

The method for producing the ink composition for inkjet recording is not particularly limited, and it can be suitably selected from conventionally known methods. For example, there is a method of obtaining an ink composition for inkjet recording by preparing a pigment dispersion according to addition of a color material, and if necessary, a dispersing agent to an organic solvent containing a polyalkylene glycol dialkyl ether and a cyclic ester and adding a binder resin containing the acrylic-based resin (A) and the copolymer (B), and if necessary, optional additive components to the pigment dispersion followed by stirring.

2. Method for Producing Printed Material and Printing Method

The method for producing a printed material of the present invention includes printing by an inkjet method with use of the ink composition for inkjet recording of the present invention.

Furthermore, the printing method of the present invention includes a step of printing by an inkjet method with use of the ink composition for inkjet recording of the present invention.

According to the method for producing a printed material and printing method of the present invention, the ink composition for inkjet recording of the present invention is used, and thus a printed material with high quality can be produced with low odor even when high-speed printing is employed.

In the present invention, the inkjet method can be suitably selected from known methods of a related art. Specific examples of the inkjet method include a charge control system in which an ink is ejected by using electrostatic attracting force, a drop-on-demand system in which vibration pressure of a piezo element (i.e., pressure pulse system) is utilized, an acoustic inkjet system in which an ink is ejected by using radiation pressure after applying acoustic beam converted from an electric signal to the ink, and thermal inkjet system in which air bubbles are formed by heating an ink and pressure generated therefrom is utilized (i.e., Bubble Jet (registered trademark)), and any one of them can be used.

In the present invention, the ink droplet amount of an ink which is ejected by an inkjet method is not particularly limited, and it can be suitably adjusted depending on use. From the viewpoint of obtaining a high-precision printed material, the ink droplet amount is preferably 0.5 to 30 pl, and more preferably 1.0 to 25 pl. Because the ink composition for inkjet recording of the present invention has an excellent ejection stability and has low odor even during drying, it allows printing of a printed material with an area of 30 $m^2$ or more within an hour.

The recording medium used for the method for producing a printed material and the printing method of the present invention is not particularly limited as long as printing can be performed by using the inkjet ink composition, and any one of an absorbing material and a non-absorbing material can be used. Examples of the absorbing material include uncoated paper such as ground wood paper, midium-quality paper or high-quality paper, coated paper such as coat paper, art paper or cast paper, cotton, synthetic fabrics, silk, hemp, cloth, unwoven cloth and leather. Examples of the non-absorbing material include, a polyester-based resin, a polypropylene-based synthetic paper, a vinyl chloride resin, a polyimide resin, metals, metal foil coat paper, glass, synthetic rubbers, and natural rubbers, but are not limited thereto.

Incidentally, the present invention is not limited to the aforementioned embodiments. These embodiments are mere exemplifications, and whatever having substantially the same constitution as the technical spirit described in the claim of the present invention and exhibiting the same working effect is embraced within the technical scope of the present invention.

Incidentally, the viscosity was measured by using "AMVn" viscometer manufactured by Anton-Paar. The particle diameter of a pigment particle was measured by using "Micro track UPA150" manufactured by NIKKISO CO., LTD.

Example 1

Preparation of Ink Composition for Inkjet Recording

The organic solvent was set to have the following composition:

Diethylene glycol diethyl ether (DEDG): 68.1 parts by mass

Diethylene glycol methyl ethyl ether (MEDG): 8.5 parts by mass

γ-Butyrolactone (GBL): 8.5 parts by mass

To a part of the solvent with above composition were added 4.0 parts by mass of carbon black (color material, "MA-8" manufactured by Mitsubishi Chemical Corporation) and 2.0 parts by mass of a dispersing agent (polyester-based polymer compound, "Hinoakuto KF1-M" manufactured by Takefu Fine Chemical Co., Ltd.) and stirred at 3000 rpm for 1 hour using a dissolver. Then, by using a bead mill filled with zirconia beads (2 mm), pre-dispersion was performed. The average particle diameter of the obtained coloring particle was 5 μm or less. Furthermore, by performing main dispersion using a nano mill filled with zirconia beads (0.3 mm), a dispersion of color material was obtained. The average particle diameter of the coloring particle obtained by the main dispersion was 60 nm.

Subsequently, under stirring the obtained dispersion of color material at 4000 rpm, 5.8 parts by mass of the acrylic-based resin (A) ("PARALOID B60" manufactured by Rohm and Haas), 3.1 parts by mass of the copolymer (B) ("SOLBIN TA3" produced by Nissin Chemical Co., Ltd.), and the remaining part of the produced organic solvent were added there to give an ink composition for inkjet recording of Example 1.

Examples 2 to 8

The ink compositions for inkjet recording of Examples 2 to 8 each were obtained in the same manner as Example 1 except that composition of each component of Example 1 was modified to those described in Table 1.

Comparative Examples 1 to 8

The ink compositions for inkjet recording of Comparative Examples 1 to 8 each were obtained in the same manner as Example 1 except that composition of each component of Example 1 was modified to those described in Table 1.

Incidentally, viscosity at 25° C. was in the range of 8 to 12 mPa·s for any of the ink compositions for inkjet recording of Examples 1 to 7 and Comparative Examples 1 to 8.

Preparation Example 1

Synthesis of Copolymer (B-1)

To 200 parts by mass of a mixture liquid consisting of water and methanol mixture solvent (mass ratio, 10:4) were added 80.5 parts by mass of vinyl chloride, 5.8 parts by mass of vinyl acetate, 13.7 parts by mass of hydroxyalkyl acrylate, 0.1 part by mass of suspending agent (hydroxypropyl methyl cellulose), and a polymerization initiator (0.025 part by mass of di-2-ethylhexyl peroxydicarbonate and 0.25 part by mass of di-3,5,5-trimethylhexanol peroxide). After increasing the temperature to 60° C. approximately, the reaction was allowed to occur in nitrogen atmosphere under stirring. Accordingly, the copolymer (B-1) which is a copolymer with number average molecular weight of 18,000 and Tg of 61° C. of which constitutional monomer includes 80.5% by mass of vinyl chloride, 5.8% by mass of vinyl acetate, and 13.7% by mass of hydroxyalkyl acrylate was obtained.

Examples 9 to 12

The ink compositions for inkjet recording of Examples 9 to 12 each were obtained in the same manner as Example 1 except that the copolymer (B-1) was used in combination with SOLBIN TA3 or instead of SOLBIN TA3 in Example 1 and composition of each component of Example 1 was modified to those described in Table 2.

Comparative Examples 9 and 10

The ink compositions for inkjet recording of Comparative Examples 9 and 10 each were obtained in the same manner as Example 9 except that composition of each component of Example 9 was modified to those described in Table 2.

Incidentally, viscosity at 25° C. was in the range of 8 to 12 mPa·s for any of the ink compositions for inkjet recording of Examples 1 to 12 and Comparative Examples 1 to 10.

TABLE 1

| | | | Comparative Example-1 | Comparative Example-2 | Example-1 | Example-2 | Example-3 | Comparative Example-3 | Comparative Example-4 | Example-4 |
|---|---|---|---|---|---|---|---|---|---|---|
| Ink composition | Color material | Carbon black | 4.0 | 4.0 | 4.0 | 4.0 | 4.0 | 4.0 | 4.0 | 4.0 |
| | Polyester-based polymer dispersing agent | | 2.0 | 2.0 | 2.0 | 2.0 | 2.0 | 2.0 | 2.0 | 2.0 |
| | Acrylic-based resin (A) | PARALOID B60 | 13.8 | 8.6 | 5.8 | 3.5 | 2.0 | 1.0 | 0.0 | 3.3 |
| | Copolymer (B) | SOLBIN TA3 | 0.0 | 2.2 | 3.1 | 4.2 | 4.7 | 5.1 | 5.4 | 3.3 |
| | | Copolymer (B-1) | 0.0 | 0.0 | 0.0 | 0.0 | 0.0 | 0.0 | 0.0 | 0.0 |
| | Vinyl chloride/vinyl acetate copolymer | SOLBIN CL | 0.0 | 0.0 | 0.0 | 0.0 | 0.0 | 0.0 | 0.0 | 0.7 |
| | Solvent | DEDG | 64.2 | 66.6 | 68.1 | 69.0 | 69.9 | 70.3 | 70.9 | 69.3 |
| | | MEDG | 8.0 | 8.3 | 8.5 | 8.6 | 8.7 | 8.8 | 8.9 | 8.7 |
| | | GBL | 8.0 | 8.3 | 8.5 | 8.6 | 8.7 | 8.8 | 8.9 | 8.7 |
| | | BGAc | 0.0 | 0.0 | 0.0 | 0.0 | 0.0 | 0.0 | 0.0 | 0.0 |
| | | MFDG | 0.0 | 0.0 | 0.0 | 0.0 | 0.0 | 0.0 | 0.0 | 0.0 |
| | | Total | 100.0 | 100.0 | 100.0 | 100.0 | 100.0 | 100.0 | 100.0 | 100.0 |
| Evaluation | Ejection property | Ejection stability | A | A | A | A | B | C | C | B |
| | | Intermittent ejection property | B | B | B | B | B | B | C | B |
| | Physical properties of coating film | Drying property | A | A | A | A | B | B | B | A |
| | | EtOH resistance | C | C | B | A | A | A | A | A |
| | | Stretchability | C | C | B | A | A | A | A | A |
| | Quality | Wettability | B | B | B | B | B | B | C | B |
| | | OD value | C | C | B | A | A | A | B | A |
| | | Satellite/feathering | A | A | A | A | B | B | C | B |
| | | Odor | B | B | B | B | B | B | B | B |

| | | | Comparative Example-5 | Example-5 | Example-6 | Example-7 | Comparative Example-6 | Example-8 | Comparative Example-7 | Comparative Example-8 |
|---|---|---|---|---|---|---|---|---|---|---|
| Ink composition | Color material | Carbon black | 4.0 | 4.0 | 4.0 | 4.0 | 4.0 | 4.0 | 4.0 | 4.0 |
| | Polyester-based polymer dispersing agent | | 2.0 | 2.0 | 2.0 | 2.0 | 2.0 | 2.0 | 2.0 | 2.0 |
| | Acrylic-based resin (A) | PARALOID B60 | 5.2 | 3.5 | 3.5 | 3.5 | 3.5 | 3.5 | 3.3 | 5.8 |
| | Copolymer (B) | SOLBIN TA3 | 0.0 | 4.2 | 4.2 | 4.2 | 4.2 | 4.2 | 3.3 | 0.0 |
| | | Copolymer (B-1) | 0.0 | 0.0 | 0.0 | 0.0 | 0.0 | 0.0 | 0.0 | 0.0 |
| | Vinyl chloride/vinyl acetate copolymer | SOLBIN CL | 2.8 | 0.0 | 0.0 | 0.0 | 0.0 | 0.0 | 0.7 | 3.1 |
| | Solvent | DEDG | 68.8 | 73.4 | 77.7 | 73.4 | 69.0 | 69.0 | 69.3 | 51.1 |

TABLE 1-continued

|  |  |  | | | | | | | | |
|---|---|---|---|---|---|---|---|---|---|---|
|  |  | MEDG | 8.6 | 0.0 | 0.0 | 0.0 | 0.0 | 0.0 | 0.0 | 8.5 |
|  |  | GBL | 8.6 | 8.6 | 4.3 | 4.3 | 12.9 | 4.3 | 8.7 | 25.5 |
|  |  | BGAc | 0.0 | 0.0 | 0.0 | 0.0 | 0.0 | 0.0 | 8.7 | 0.0 |
|  |  | MFDG | 0.0 | 4.3 | 4.3 | 8.6 | 4.3 | 12.9 | 0.0 | 0.0 |
|  |  | Total | 100.0 | 100.0 | 100.0 | 100.0 | 100.0 | 100.0 | 100.0 | 100.0 |
| Evaluation | Ejection property | Ejection stability | C | A | B | B | A | B | C | A |
|  |  | Intermittent ejection property | B | A | B | A | A | A | A | A |
|  | Physical properties of coating film | Drying property | A | B | A | B | B- | B | C | C |
|  |  | EtOH resistance | A | A | A | A | A | A | A | A |
|  |  | Stretchability | B | A | A | A | A | A | A | A |
|  | Quality | Wettability | C | B | A | A | C | A | B | C |
|  |  | OD value | C | B | A | A | C | A | B | C |
|  |  | Satellite/feathering | C | A | B | B | A | B | C | A |
|  |  | Odor | B | B | A | A | C | B | C | C |

TABLE 2

|  |  |  | Comparative Example-9 | Example-9 | Example-10 | Example-11 | Comparative Example-10 | Example-12 |
|---|---|---|---|---|---|---|---|---|
| Ink composition | Color material | Carbon black | 4.0 | 4.0 | 4.0 | 4.0 | 4.0 | 4.0 |
|  | Polyester-based polymer dispersing agent |  | 2.0 | 2.0 | 2.0 | 2.0 | 2.0 | 2.0 |
|  | Acrylic-based resin (A) | PARALOID 860 | 9.6 | 3.9 | 2.8 | 1.9 | 1.1 | 2.7 |
|  | Copolymer (B) | SOLBIN TA3 | 0.0 | 0.0 | 0.0 | 0.0 | 0.0 | 1.2 |
|  |  | Copolymer (B-1) | 2.4 | 4.8 | 5.2 | 5.6 | 6.0 | 3.9 |
|  | Vinyl chloride/vinyl acetate copolymer | SOLBIN CL | 0.0 | 0.0 | 0.0 | 0.0 | 0.0 | 0.0 |
|  | Solvent | DEDG | 65.6 | 68.2 | 68.8 | 69.2 | 69.5 | 69.0 |
|  |  | MEDG | 8.2 | 8.5 | 8.6 | 8.7 | 8.7 | 8.6 |
|  |  | GBL | 8.2 | 8.5 | 8.6 | 8.7 | 8.7 | 8.6 |
|  |  | BGAc | 0.0 | 0.0 | 0.0 | 0.0 | 0.0 | 0.0 |
|  |  | MFDG | 0.0 | 0.0 | 0.0 | 0.0 | 0.0 | 0.0 |
|  |  | Total | 100.0 | 100.0 | 100.0 | 100.0 | 100.0 | 100.0 |
| Evaluation | Ejection property | Ejection stability | A | A | A | B | C | A |
|  |  | Intermittent ejection property | B | A | A | A | A | A |
|  | Physical properties of coating film | Drying property | A | A | B | B- | B | B |
|  |  | EtOH resistance | C | B | A | A | A | A |
|  |  | stretchability | C | B | B | A | A | A |
|  | Quality | Wettability | B | B | B | B | B | B |
|  |  | OD value | C | B | A | A | A | A |
|  |  | Satellite/feathering | A | A | A | A | B | A |
|  |  | Odor | B | B | B | B | B | B |

Incidentally, in Table 1 and Table 2, content of each component indicates a value obtained by rounding each measured value to one decimal place, and the "total" Table 1 and Table 2 indicates a value obtained by rounding the total of measured value of each component to one decimal place.

Abbreviated symbols in Table 1 and Table 2 are as described below.

Carbon black: carbon black MA-8 manufactured by Mitsubishi Chemical Corporation

PARALOID B60: methyl methacrylate-butyl methacrylate copolymer manufactured by Rohm and Haas, Tg of 75° C., mass average molecular weight of 50,000

SOLBIN TA3: copolymer with number average molecular weight of 24,000 and Tg of 65° C. manufactured by Nissin Chemical Co., Ltd., in which monomers are as follows: 83% by mass of vinyl chloride, 4% by mass of vinyl acetate, and 13% by mass of hydroxyalkyl acrylate SOLBIN CL: vinyl chloride-vinyl acetate copolymer with number average molecular weight of 25,000 manufactured by Nissin Chemical Co., Ltd., in which monomers are as follows: 86% by mass of vinyl chloride and 14% by mass of vinyl acetate Polyester-based polymer copolymer: Hinoakuto KF1-M manufactured by Takefu Fine Chemical Co., Ltd.

DEDG: diethylene glycol diethyl ether

MEDG: diethylene glycol methyl ethyl ether

GBL: γ-butyrolactone

BGAc: ethylene glycol monobutyl ether acetate

MFDG: dipropylene glycol monomethyl ether

[Evaluation]

<Evaluation of Ejection Stability>

In an environment with room temperature of 25±3 (° C.) and humidity of 45±5% RH, each of the ink composition for inkjet recording of Examples and Comparative Examples was ejected continuously by using an ejection tester equipped with piezoelectric-driven inkjet head KM512MHX (manufactured by Konica Minolta, Inc.) while increasing the ejection speed of liquid droplet by boosting the application voltage. Then, the maximum speed at which stable ejection is exhibited without any scattering was measured. The results are shown in Table 1 and Table 2.

(Criteria for Evaluating Ejection Stability)

A: The maximum speed was 10 m/s or more.

B: The maximum speed was 8 m/s or more and less than 10 m/s.

C: The maximum speed was less than 8 m/s.

When the ejection stability evaluation is found to be A or B, it is determined to have excellent ejection stability during high-speed printing so that it can be used without practically bringing up any problem.

<Evaluation of Intermittent Ejection Property>

In an environment with room temperature of 25±3 (° C.) and humidity of 45±5% RH, each of the ink composition for inkjet recording of Examples and Comparative Examples was ejected continuously by using an ejection tester equipped with piezoelectric-driven inkjet head KM512MHX. After allowing it stand for a while without covering with a cap, it was ejected again and the re-ejection state was observed with a monitor. The longest keeping time during which the number of missing nozzles is less than 5 at the re-ejection was measured. The results are shown in Table 1 and Table 2.

(Criteria for Evaluating Intermittent Ejection Property)

A: The number of missing nozzles was less than 5 even after keeping for 3 minutes or longer.

B: The longest keeping time during which the number of missing nozzles is 5 or more at the re-ejection was 1 minute or longer and shorter than 3 minutes.

C: The longest keeping time during which the number of missing nozzles is 5 or more at the re-ejection was shorter than 1 minute.

When the intermittent ejection property evaluation is found to be A or B, it is determined to have an excellent intermittent ejection property so that it can be used without practically bringing up any problem.

<Evaluation of Drying Property of Coating Film>

In an environment with room temperature of 25±3 (° C.) and humidity of 45±5% RH, each of the ink composition for inkjet recording of Examples and Comparative Examples was subjected to solid printing (720 dpi) on a recording medium (vinyl chloride sheet JT5829R manufactured by MACtac, LLC) by using an ejection tester equipped with piezoelectric-driven inkjet head KM512MHX. Accordingly, a coating film was formed. The recording medium having a coating film formed thereon was heated on a hot plate at 45° C. and the time required to have no tacky feeling by fingertouch was measured. The results are shown in Table 1 and Table 2.

(Criteria for Evaluating Drying Property)

A: Drying was complete within 2 minutes.

B: Drying was complete after 2 minutes but within 5 minutes.

B⁻: Drying was complete after 5 minutes but within 7 minutes.

C: Drying was not complete even after 7 minutes.

When the drying property evaluation is found to be A or B, it is determined to have an excellent drying property. When it is B⁻, it is determined that it can be used without practically bringing up any problem.

<Evaluation of Ethanol Resistance of Coating Film>

A coating film was formed in the same manner as the above drying property evaluation. It was then dried for 5 minutes in an oven at 60° C. and dried again for 12 hours or longer at room temperature to give a dry coating film. By using a cloth (BENCOTTON, manufactured by Asahi Kasei Corporation) wetted with an aqueous ethanol solution, the surface of the coating film was wiped to observe whether or not the recording medium was visible. The same test was carried out with change of concentration of the aqueous ethanol solution, and the maximum concentration of ethanol at which the recording medium was not exposed was measured. The results are shown in Table 1 and Table 2.

(Criteria for Evaluating Ethanol Resistance)

A: Recording medium was not exposed even when 50% or higher aqueous ethanol solution was used.

B: Recording medium was exposed when 30% or higher but lower than 50% aqueous ethanol solution was used.

C: Recording medium was exposed when lower than 30% aqueous ethanol solution was used.

When the ethanol resistance evaluation is found to be A or B, it is determined to have an excellent ethanol resistance so that it can be used without practically bringing up any problem.

<Evaluation of Stretchability of Coating Film>

A coating film was formed in the same manner as the above ethanol resistance evaluation. By using an optical densitometer, each of the color coordinates (L, a, b) of the drying coating film was measured and designated as $L_1$, $a_1$, $b_1$.

Subsequently, the recording medium having the dry coating film was stretched by 1.5 times using an autograph. After that, the color coordinates of the stretched coating film were measured and designated as $L_2$, $a_2$, $b_2$. The color difference ΔE*ab before and after the stretched was calculated based on the following formula (1). The results are shown in Table 1 and Table 2. Incidentally, as an optical densitometer, Spectrolino manufactured by GretagMacbeth was used, and the measurement was carried out by using D65 light source.

$$\Delta E^*ab = \{(L_2-L_1)^2+(a_2-a_1)^2+(b_2-b_1)^2)^2\}^{1/2} \qquad \text{Formula (1)}$$

(Criteria for Evaluating Stretchability)

A: Color difference was less than 5.

B: Color difference was 5 or more but less than 10.

C: Color difference was 10 or more.

When the stretchability evaluation is found to be A or B, it is determined to have an excellent stretchability so that it can be used without practically bringing up any problem.

<Evaluation of Wettability of Coating Film>

In an environment with room temperature of 25±3 and humidity of 45±5% RH, each of the ink composition for inkjet recording of Examples and Comparative Examples was subjected to gray scale printing on a recording medium (vinyl chloride sheet JT5829R manufactured by MACtac, LLC) by using an ejection tester equipped with piezoelectric-driven inkjet head KM512MHX. Then, by using an optical microscope, the dot diameter was measured. The results are shown in Table 1 and Table 2.

(Criteria for Evaluating Wettability)

A: It was 80 μm or larger.

B: It was 70 μm or larger but smaller than 80 μm.

C: It was smaller than 70 μm.

When the wettability evaluation is found to be A or B, it is determined to have an excellent wettability so that it can be used without practically bringing up any problem.

<Evaluation of Density of Printed Material>

The gray scale printing was performed in the same manner as the above wettability evaluation. The obtained coating film was then dried for 5 minutes in an oven at 60° C. and dried again for 12 hours or longer at room temperature to give a dry coating film. The optical reflection density (OD value) of the obtained coating film was measured by using the above optical densitometer. The results are shown in Table 1 and Table 2.

(Criteria for Evaluating Density of Printed Material)
A: OD value was 2.5 or more.
B: OD value was 2.2 or more and less than 2.5.
C: OD value was less than 2.2.

When the concentration evaluation is found to be A or B, a printed material with high quality can be obtained, and thus it is evaluated that it can be used without practically bringing up any problem.

<Evaluation of Satellite/Feathering of Printed Material>

The fine-print (6 pt) printing was performed in the same manner as the above wettability evaluation. The obtained coating film was then dried for 5 minutes in an oven at 60° C. and an occurrence of satellite (scattering) and feathering in the printed material was observed with a naked eye. The results are shown in Table 1 and Table 2.

(Criteria for Evaluating Satellite/Feathering)
A: Feathering and ink scattering were hardly observed, and a 6-pt letter was clearly printed.
B: Slight feathering or ink scattering was observed, but the decorative property of the printed material was not impaired by them.
C: Due to feathering or ink scattering, the letter cannot be recognized.

When the satellite/feathering evaluation is found to be A or B, a printed material with high quality can be obtained, and thus it is evaluated that it can be used without practically bringing up any problem.

<Odor Test>

Each of the ink composition for inkjet recording (0.5 g) of Examples and Comparative Examples was added to a petri dish, and kept for 2 minutes on a hot plate at 45° C. Then odor sensory test was performed. The results are shown in Table 1 and Table 2.

(Evaluation Criteria for Odor Test)
A: Odor was hardly observed.
B: Slight odor was observed.
C: Unpleasant odor was observed.

When the odor evaluation is found to be A or B, it is found to be low odor and also evaluated to have low odor even for high-speed printing.

[Summary of Results]

The ink composition of Comparative Example 1 not containing the copolymer (B) and the ink composition of Comparative Example 2 in which a content ratio of the copolymer (B) is low, i.e., content ratio by mass of the acrylic-based resin (A) to the copolymer (B) is as follows; (A)/(B)=80/20, gave a printed material with low optical density, and thus a printed material with high quality was not obtained. Furthermore, the coating film of the ink composition of Comparative Examples 1 and 2 exhibited a significant color change at stretched. It is believed that the coating film of Comparative Examples 1 and 2 had an occurrence of cracks at stretched. The coating film of Comparative Examples 1 and 2 also had poor ethanol resistance.

With the ink composition of Comparative Example 5 and Comparative Example 8 in which a vinyl chloride/vinyl acetate copolymer was used instead of the copolymer (B), a printed material with high quality was not obtained. It is also believed that, when the content ratio of cyclic ester is reduced without using the copolymer (B) like Comparative Example 5, the vinyl chloride/vinyl acetate copolymer is insufficiently dissolved so that a microgel is yielded. For such reasons, the ejection stability or intermittent ejection property was deteriorated, and thus it became unsuitable for high-speed printing and a satellite occurred. To improve the ejection stability or intermittent ejection property and inhibit an occurrence of satellite, it was necessary to increase the content ratio of cyclic ester like Comparative Example 8. Based on the results above, it was found that, if the copolymer (B) is not used, it is impossible to have an ink composition which has low odor and can be printed at high-printing speed.

The ink composition of Comparative Example 3 in which a content ratio by mass of the copolymer (A) was low, i.e., content ratio of the acrylic-based resin (A) to the copolymer (B) was as follows; (A)/(B)=16/84, exhibited poor ejection stability and thus an ink composition suitable for high-speed printing was not able to be provided. Furthermore, the ink composition of Comparative Example 4 in which the acrylic-based resin (A) was not used had poor ejection stability or intermittent ejection property and produced a satellite.

The ink composition of Comparative Example 6 in which γ-butyrolactone was contained at 12.9% by mass had strong odor, and thus it was not suitable for high-speed printing, and exhibited feathering and lowered print concentration. Furthermore, the ink composition of Comparative Example 7 in which ethylene glycol monobutyl ether acetate was contained at 8.7% by mass had strong odor, and thus it was not suitable for high-speed printing, and exhibited feathering due to poor drying property.

It was found that the ink composition for inkjet recording according to Examples 1 to 12, in which the content ratio by mass of the acrylic-based resin (A) to the copolymer (B) ((A)/(B)) was 25/75 or more and 70/30 or less by mass, at least a polyalkylene glycol dialkyl ether and a cyclic ester were contained, the organic solvent was a mixed solvent in which the content ratio of the cyclic ester was 3 parts by mass or more and 10 parts by mass or less relative to 100 parts by mass of the ink composition, and the content ratio of ethylene glycol alkyl ether acetate was 5 parts by mass or less relative to 100 parts by mass of the ink composition, had excellent ejection stability and intermittent ejection property, and the coating film obtained therefrom had an excellent drying property with low odor, and thus it was suitable for high-speed printing. Furthermore, the obtained printed material was found to have high quality with high optical density and also have excellent ethanol resistance or stretchability.

Furthermore, when Example 2 and Example 9 were compared to each other, it was found that, with Example 2 using the copolymer (B) with number average molecular weight of 24,000, a printed material having excellent ethanol resistance or stretchability and high optical density tended to be easily produced. Meanwhile, it was found that, with Example 9 using the copolymer (B) with number average molecular weight of 18,000, an excellent intermittent ejection property tended to be exhibited.

The invention claimed is:

1. An ink composition for inkjet recording, comprising: a color material, a binder resin, and an organic solvent,
wherein the binder resin contains at least an acrylic-based resin (A), and a copolymer (B) having a constitutional unit derived from a hydroxyalkyl (meth)acrylate, a constitutional unit represented by the following general formula (I), and a constitutional unit represented by the following general formula (II), the acrylic-based resin (A) is different from the copolymer (B), a content ratio by mass of the acrylic-based resin (A) to the copolymer (B) ((A)/(B)) is 25/75 or more and 70/30 or less, and wherein the organic solvent contains at least a polyalkylene glycol dialkyl ether and a cyclic ester, a content ratio of the cyclic ester is 3 parts by mass or more and 10 parts by mass or less relative to 100 parts by mass of the ink composition, and a content ratio of an ethylene glycol alkyl ether acetate is 5 parts by mass or less relative to 100 parts by mass of the ink composition:

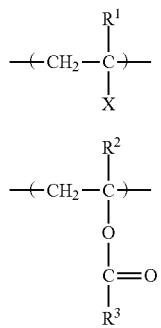

wherein each of $R^1$ and $R^2$ is independently a hydrogen atom, or a methyl group; $R^3$ is an alkyl group having 1 to 3 carbon atoms; and X is a halogen atom.

2. The ink composition for inkjet recording according to claim 1, wherein the organic solvent further contains a polyalkylene glycol alkyl ether represented by the following general formula (III), and a content ratio of the poiyalkylene glycol alkyl ether is 3 parts by mass or more and 15 parts by mass or less relative to 100 parts by mass of the ink composition:

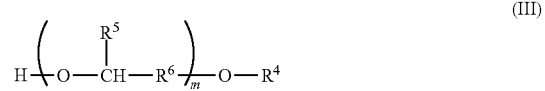

wherein $R^4$ is an alkyl group having 1 to 4 carbon atoms; $R^5$ is a hydrogen atom, or a methyl group; $R^6$ is a methylene group or an ethylene group; and m is an integer of 2 or more and 4 or less; a plurality of $R^5$s can be the same or different; and a plurality of $R^6$s can be the same or different.

3. A method for producing a printed material comprising:
printing by an inkjet method using the ink composition for inkjet recording defined by claim 1.

4. A printing method comprising:
printing by an inkjet method using the ink composition for inkjet recording defined by claim 1.

5. A method for producing a printed material comprising:
printing by an inkjet method using the ink composition for inkjet recording defined by claim 2.

6. A printing method comprising:
printing by an inkjet method using the ink composition for inkjet recording defined by claim 2.

* * * * *